(12) United States Patent
Sasaki et al.

(10) Patent No.: US 6,530,449 B2
(45) Date of Patent: Mar. 11, 2003

(54) HOOD ASSEMBLY FOR VEHICLE

(75) Inventors: Sakae Sasaki, Wako (JP); Kaoru Nagatomi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/904,798

(22) Filed: Jul. 13, 2001

(65) Prior Publication Data

US 2002/0011371 A1 Jan. 31, 2002

(30) Foreign Application Priority Data

Jul. 19, 2000 (JP) ........................... 2000-219292
Jul. 27, 2000 (JP) ........................... 2000-227891

(51) Int. Cl.[7] ........................ B60R 21/34; B62D 25/12
(52) U.S. Cl. ........................... 180/274; 180/69.21
(58) Field of Search ..................... 180/69.21, 274, 180/281; 296/194, 189; B60R 21/34

(56) References Cited

U.S. PATENT DOCUMENTS

| 6,217,108 B1 | 4/2001 | Sasaki |
| 6,257,657 B1 | 7/2001 | Sasaki |

FOREIGN PATENT DOCUMENTS

| DE | 694 00 889 | 3/1997 | |
| DE | 100 33 148 | 3/2001 | |
| DE | 100 35 105 | 6/2001 | |
| EP | 0 630 801 | 11/1996 | |
| JP | 09315266 | 12/1997 | |
| JP | 10-258774 | 9/1998 | |
| JP | 10258774 | 9/1998 | |
| JP | 11-115680 A | * 4/1999 | |
| JP | 11-310157 | 9/1999 | |
| JP | 2000-16340 A | * 1/2000 | |
| JP | 2001-206245 A | * 7/2001 | |
| WO | WO 00/698704 | * 11/2000 | |

* cited by examiner

Primary Examiner—Paul N. Dickson
Assistant Examiner—Ruth Ilan
(74) Attorney, Agent, or Firm—Merchant & Gould, P.C.

(57) ABSTRACT

A vehicular hood assembly comprising at least one actuator for lifting up a rear end of a hood to a given height when a vehicle s collides with a protective object. The actuator comprises a rod having a constricted portion with lower rigidity than the other part thereof. The actuator is operated responsive to collision of the vehicle with the protective object to cause the rod to lift the hood and when the protective object further encounters a secondary collision with the hood, an impact load exerted to the protective object and the hood is concentrated on the rod to cause the constricted portion of the rod to bend for thereby retaining the hood at its lifted position without causing the rod to return to its original position.

8 Claims, 7 Drawing Sheets

(COMPARATIVE EXAMPLE)

(PRESENT EMBODIMENT)

HOOD ASSEMBLY FOR VEHICLE

BACKGROUND OF THE INVENTION

1. Field of the Invention

The present invention relates to an improvement in a hood assembly of a vehicle and, more particularly, to an improvement in positioning and arrangement of an actuator for lifting up a hood.

2. Description of the Related Art

It has heretofore been proposed to provide a vehicular hood assembly for lifting up a rear end of a hood and retaining the hood at a lifted height when a running vehicle collides with an object to be protected (protective object), as is known from, for example, Japanese Patent Laid-Open Publication NO. HEI-9-315266.

The known hood assembly includes a protective object collision sensor which detects collision of a running vehicle against the protective object to thereby produce a detection signal. The detection signal is then supplied to a control unit which generates a command signal to operate an actuator of a hood lift-retaining mechanism for lifting up the hood, which is consequently retained at its lifted position. A hook, which is pivotally supported with a rod of the actuator by means of a retainer pin, is urged such that a part of the hook protrudes from the rod by the action of a compression spring located in the rod.

When the actuator is operated to raise the rod for thereby lifting up the hood, the hook is forced to protrude by the action of the compression spring to be brought into engagement with a vehicle body, thereby avoiding lowering movement of the rod to retain the hood at its lifted position.

However, in order to avoid the rod from being lowered, the actuator is constructed of the hook, the retainer pin and the compression spring, with a resultant increase in the number of component parts to render the structure to be complicated Further, the assembling work for these small-sized component parts such as the hook, the retainer pin and the compression spring needs a troublesome skilled practice, thus deteriorating assembling efficiency of the actuator.

In addition, provision of the actuator located at the rear end of the hood makes the use of the actuator to be limited to a particular type which has a given lifting force. For this reason, it is necessary to prepare individual actuators of various types is which provide lifting forces independent from each other so as to meet the hoods of the respective vehicles of various models. Also, it is required to prepare the actuator which has an increased lifting force depending on the position in which the hinge mechanism is located for opening or closing the hood, with a resultant increase in size of the actuator with difficulty encountered in miniaturization and weight reduction of the actuator.

SUMMARY OF THE INVENTION

It is therefore an object of the present invention to provide an actuator for a hood assembly of a vehicle, which has a reduced number of component parts to enable easy assemblage of the same.

Another object of the present invention is to provide a hood assembly of a vehicle, which is capable of effecting miniaturization of an actuator while enabling an actuator of a single kind to be provided which can be commonly applied to hoods of various kinds different in models of the vehicles.

According to an aspect of the present invention, there is provided a hood assembly for a vehicle, which comprises a vehicular hood, and at least one actuator for lifting up a rear end of the vehicular hood to a given height when the vehicle collides with a protective object. The actuator includes a rod having a part with lower rigidity than that of the other part of the rod. The rod is bendable at the lower rigidity part when the rod is raised to lift up the hood.

Preferably, the lower rigidity part is comprised of a constricted portion having a smaller diameter than that of the is other part of the rod.

When the vehicle collides with the protective object, the actuator is operated to raise its rod for lifting up the hood by a given height. Then, the protective object encounters a secondary collision with the hood, an impact load exerted to the protective object and the hood itself is concentrated to the rod, which is consequently bent at its constricted portion, which has the lower rigidity part, without returning to its original position. Use of a bending mechanism of the rod allows the hood to be retained at its lifted position. Accordingly, it is unnecessary to specially provide an independent rod retaining mechanism through the use of the aforementioned bending mechanism of the rod, with a resultant reduction in the number of component parts while enabling the actuator to be assembled at an improved assembling work efficiency.

Desirably, the actuator is provided at an arbitrary position rearward of the center of gravity of the hood in a longitudinal direction of the vehicle. More particularly, the actuator is located in an area rearward of the center of gravity of the hood at a suitable position near the rear end of the hood or near the center of gravity of the hood depending on the kinds of the hoods. Accordingly, the actuator of a single kind can be commonly applied to the hoods of various types different in shape and/or weight. For example, in a case where the hood has a heavy weight, the actuator may be located at a position near the rear end of the hood. In a case where the hood has a light weight, the actuator may be located at another position rearward of the Center of gravity of the hood in close proximity thereto. That is, even with the provision of the actuator of a single kind, i.e., with a type which provides a constant lifting force, the actuator may be located at a selected position to meet the hoods of various kinds which differ in weight and shape for thereby rendering the actuator to be commonly applied to the hoods of the various types.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

The following description is merely exemplary in nature and is in no way intended to limit the invention, its application or uses.

Figure 1:
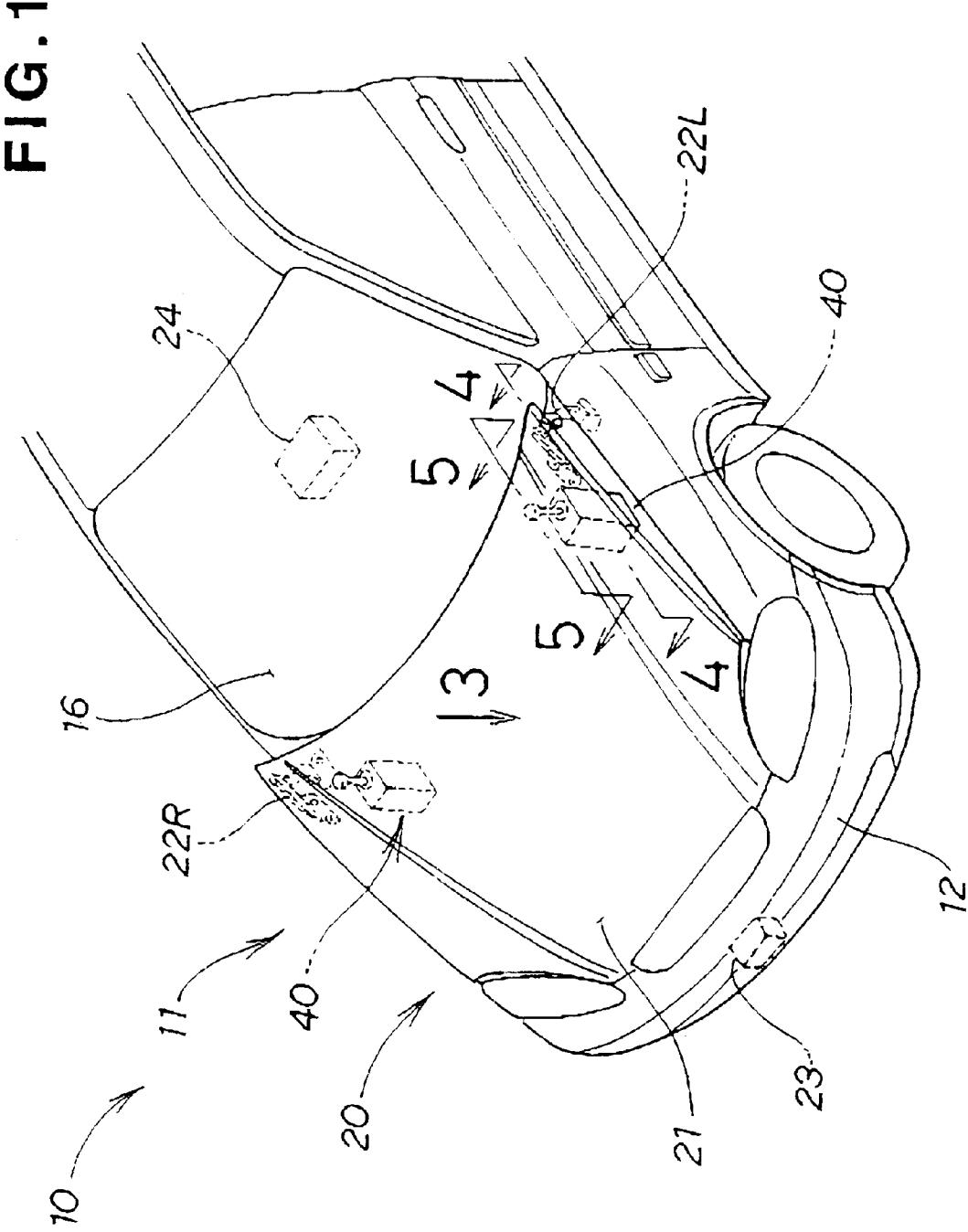
FIG. 1 is a schematic perspective view of a vehicle having an actuator of a vehicular hood assembly according to a preferred embodiment of the present invention.
Figure 2:
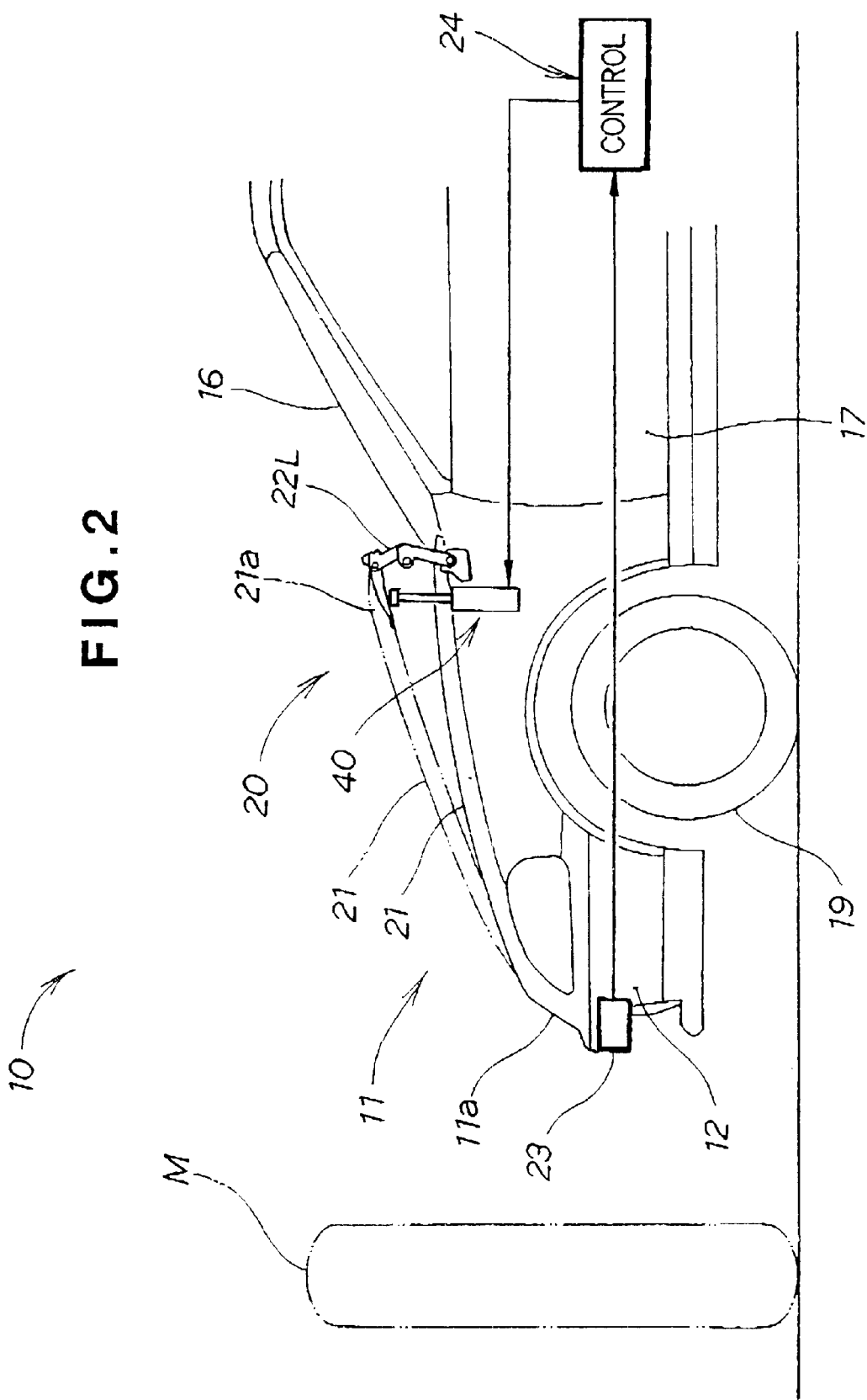
FIG. 2 is a side elevational view of the vehicle shown in FIG. 1.
Figure 3:
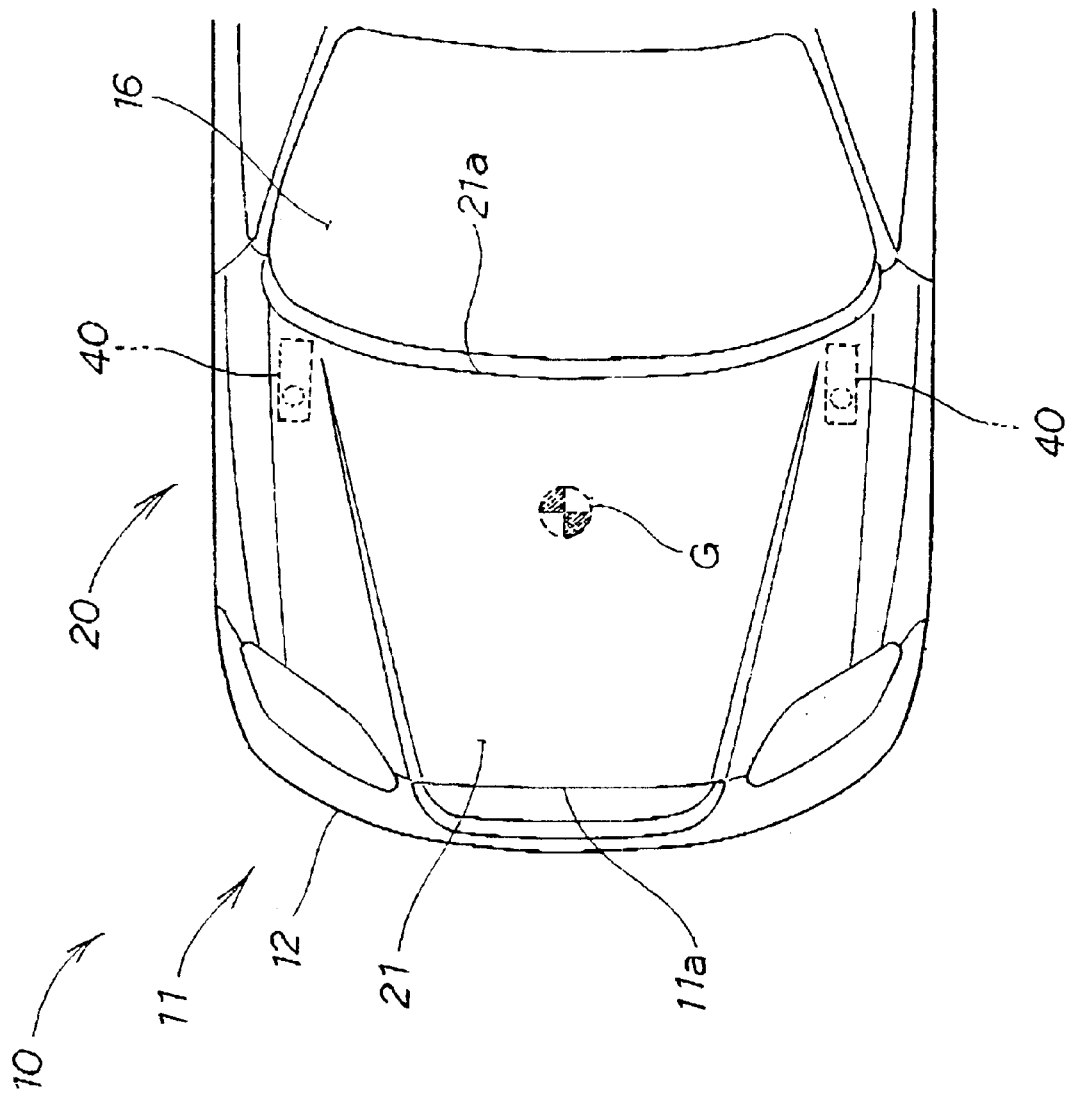
FIG. 3 illustrates the vehicle as viewed in the direction of arrow 3 of FIG. 1.

Referring now to FIGS. 1 to 3, there is shown a vehicle 10 having a vehicular hood assembly 20 according to a preferred embodiment of the present invention. As shown in FIGS. 1 and 2, the vehicle 10 has a vehicle body 11, whose front portion 11 is formed with an engine compartment. An opening portion of the engine room is concealed by a hood 21. A rear end of the hood 21 is pivotally supported by the vehicle body 11 by means of left and right hinge mechanisms 22L, 22R which are in turn mounted to the vehicle body 11 for opening and closing movements. A front end of the hood 21 is locked to the vehicle body 11 by means of a hood lock (not shown). Reference numeral 16 designates a front glass.

Apart from the right and left hood hinges 22R, 22L, the hood assembly 20 includes a bumper sensor 23, left and right actuators 40, 40 for lifting up the hood 21 and a control unit 24. The bumper sensor 23 is mounted to a front bumper 12 of the vehicle 10. The bumper sensor 23 generates a detection signal when the vehicle 10 encounters collision with a protective object M. The bumper sensor 23 is comprised of an accelerator sensor. The left and right actuators 40, 40 are arranged such that when the vehicle 10 collides with the protective object M, the left and right actuators 40, 40 serve to lift up a rear end portion 21a of the hood 21, which is preliminarily held in a closed.condition, by a given height about the center of a front end 11a of the vehicle body 11. The control unit 24 is constructed chiefly of a microcomputer.

The left and right actuators 40, 40 are located at respective arbitrary positions rearward of tie center of gravity G of the hood 21 in a lengthwise direction of the vehicle, as viewed in FIG. 3. When the vehicle 10 collides with the protective object M shown in FIG. 2, the actuators 40, 40 lift up the rear end portion of the hood 21 about the center of the front distal end 11a of the vehicle body 11 by the given height. In order to lift up the hood 21, the left and right actuators 40, 40 should be arranged to produce a lifting force with a given magnitude. By locating the left and right actuators 40, 40 at the respective positions rearward of the center of gravity G of the hood 21, it is possible for the actuators 40, 40, each of which produces a low lifting force, to be employed to allow the actuators 40, 40 to be minimized in structure. The location of the actuators 40, 40 in the respective arbitrary positions renders the actuators 40, 40 to meet the hood 21 of various kinds different in shape or weight even when the lifting forces of the actuators remains at a constant value. That is, it is possible for the actuators 40, 40 to be commonly used in various applications. Accordingly, miniaturization and common use of the actuators lead to a reduction in manufacturing cost of the actuators.

The actuators 40, 40 are allowed to be located at the respective positions rearward of the center of gravity G of the hood 21 so as to meet the shape or weight of the hood 21 different from one another in dependence on various models of the vehicles. In particular, in the event the hood 21 has a larger weight, the actuators 40, 40 are located at the respective positions rearward of the center of gravity G of the hood 21 in the vicinity of the rear end portion 21a thereof, whereas when the hood 21 has a lower weight, the actuators 40, 40 are located at the respective positions rearward of the center of gravity G of the hood 21 in the vicinity thereof. Thus, by locating the actuators 40, 40 at the respective arbitrary positions rearward of the center of gravity G of the hood 21, it is possible for the actuators 40, 40 of a single kind to meet various kinds of hood 21 different in shape or weight in dependence on the models of the vehicles.

Figure 4:
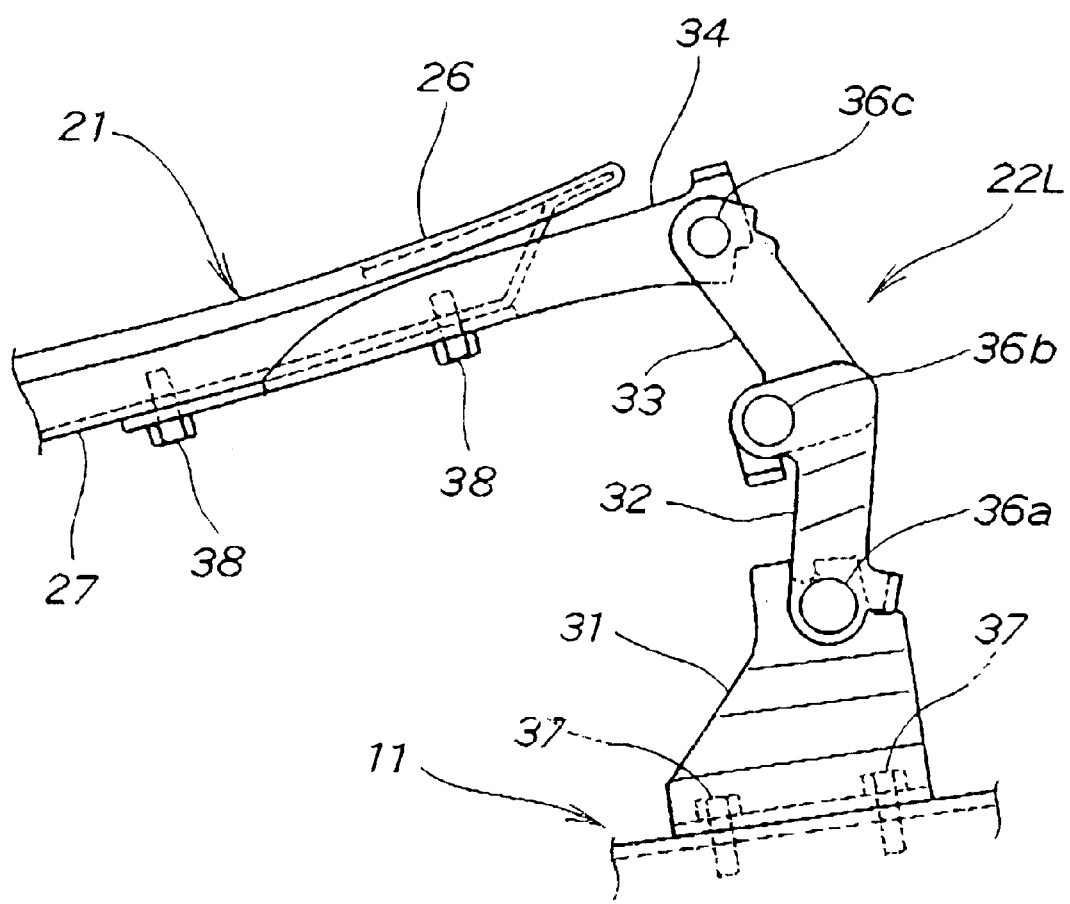
FIG. 4 is a cross sectional view, taken along line 4—4 of FIG. 1, illustrating an actuator.

FIG. 4 illustrates, on an enlarged scale, details of the left hinge mechanism 22L of the left and right hinge mechanisms 22L and 22R.

The vehicular hood 21 includes an outer panel 26 which forms part of a trim of the vehicle, and an inner panel 27 piled with the outer panel 26 on its inner side in a reinforced structure.

The hinge mechanism 22L is constructed of a hinge base 31 fixedly secured to the vehicle body 11 by bolts 37, 37, a first link 32 having its one end pivotally supported by the hinge base 31 by means of a pin 36a, a second link 33 having its one end pivotally supported by the other end of the fist link 32 via a pin 36a, and a hood mounting stator 34 pivotally supported by the other end of the second link 33 via a pin 36c, Reference numerals 38, 38 designate bolts for mounting the hood 21 to the hood mounting stator 34. The right hinge mechanism 22R shown in FIG. 1 has the same structure as the left hinge mechanism 22L and, therefore, its detailed description will be omitted.

Figure 5:
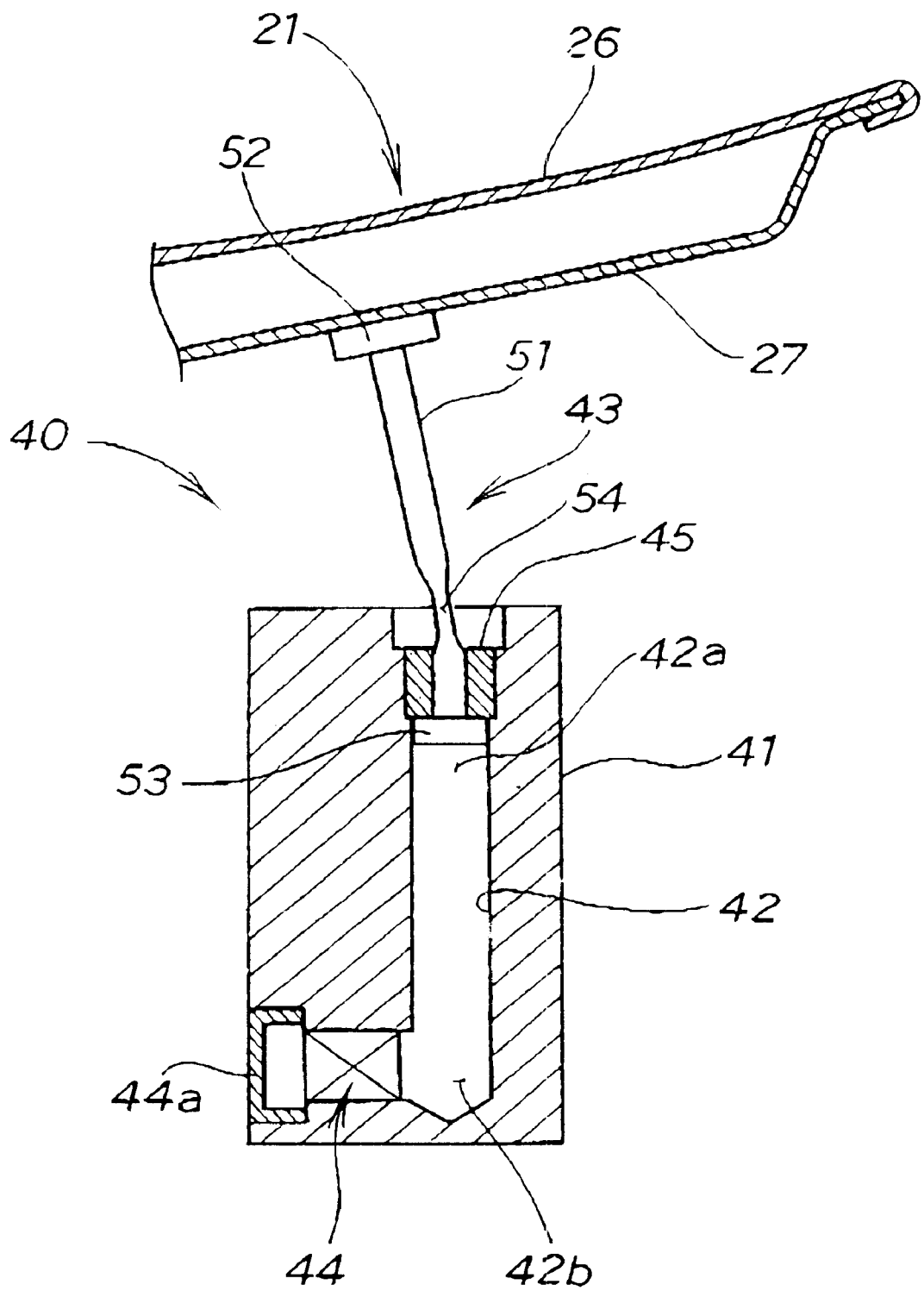
FIG. 5 is a cross sectional view, taken along line 5—5 of FIG. 1, illustrating the actuator.

Reference is now made to FIG. 5 showing, in enlarged section, one of the actuators 40, 40.

The actuator 40 includes an actuator block 41 mounted to the vehicle body 11 (see FIG. 1), a cylinder section 42 formed in the actuator block 41, a rod 43 designed to be inserted into the cylinder section 42 from its one side 42a, a gas generator 44 located in the other side 42b of the cylinder section 42 so as to raise the rod 43 at a high speed, and a piston-removal stopper member 45 located at the one side 42a of the cylinder section 42 to prevent the piston 53 from being removed out from the cylinder section 42.

The actuator block 41 is made of aluminum alloy or iron alloy. The cylinder section 42 is composed of a substantially cylindrical structure.

The rod 43 has a rod body 51, a pad 52 fixed to a distal end of the rod body 51, and a piston 53 integrally connected to the other distal end of the rod body 51 and received in the cylinder section 42 for sliding movement. The pad 52 is held in abutting engagement with a lower surface of the hood 21. The other end, near the piston 53, of the rod body 51 has a constricted portion 54 which is bent when the rod 43 is raised to lift up the hood 21 and the protective object, shown in FIG. 2, encounters a secondary collision with the hood 21. The constricted portion 54 is formed at the other end of the rod body 51 such that when the rod 43 protrudes in its maximum position, the constricted portion 54 projects from the piston-removal stopper member 45. The constricted portion 54 is shaped to have a smaller diameter than the outer diameter of the rod body 51.

The gas generator 44 is closed with a cover member 44a of the actuator block 41 and incorporates therein explosives to generate motive gas.

The piston-removal stopper member 45 functions to prevent the piston 53, which has been raised upward, from removing out of the cylinder section 41 and concurrently to retain the rod body 51, which is bent, with the constricted portion 54.

As discussed above, the actuator 40 is arranged to allow the rod 43 to be bent at the constricted portion 54 when the rod 43 is raised to lift up the hood 21 and the protective object M encounters the secondary collision with the hood 21. That is, where the protective object M encounters the secondary collision with the hood 21, the impact load is concentrated on the hood 21. Thus, with the constricted portion 54 formed in the rod body 51, the rod body 51 is bent at the constricted portion 54 to prevent the rod 43 from returning to its original position so that the actuator 40 holds the hood 21 at a given height.

When compared with a case wherein a rod retaining mechanism for the rod 43 is located to retain the hood 21 at the given height, the presence of the actuator 40 of the present invention utilizing a unique mechanism wherein the rod body 51 is bent by itself allows the actuator 40 to be provided in a simplified structure having a reduced number of component parts, with a resultant reduction in manufacturing cost while providing an improved assembling work efficiency of the actuator 40.

Figure 6A:
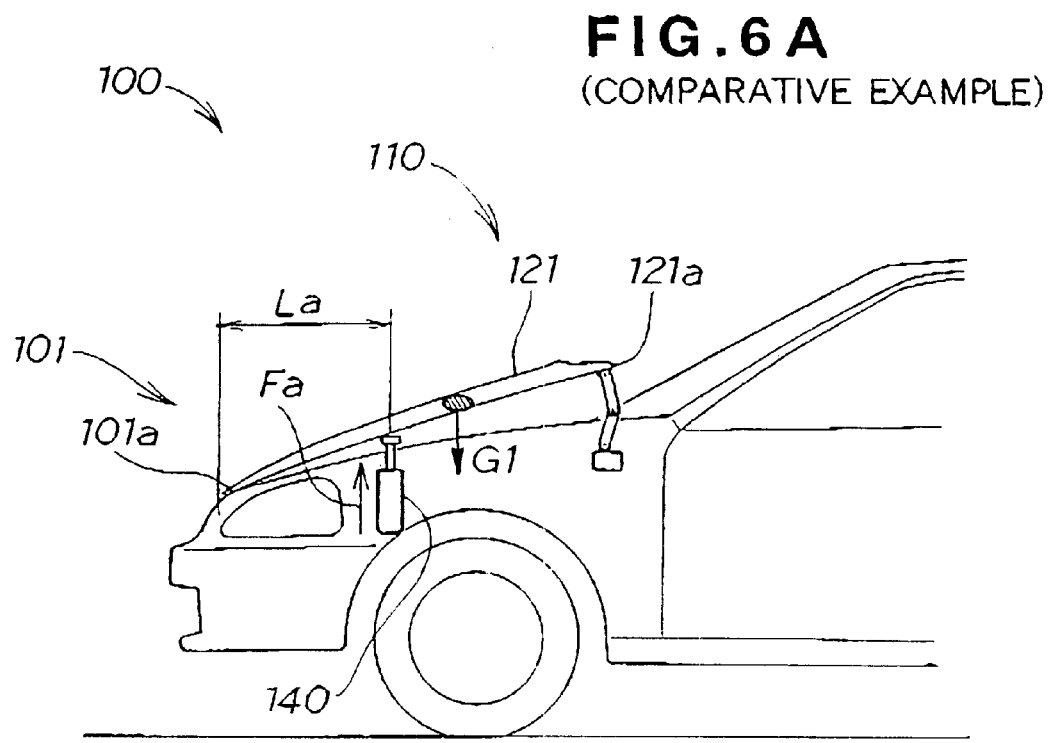
FIGS. 6A and 6B are schematic views illustrating a comparison example wherein an actuator is located at a position forward of the center of gravity of a hood, and the preferred embodiment of the present invention wherein the actuator is located at a position rearward of the center of gravity of the hood.
Figure 6B:
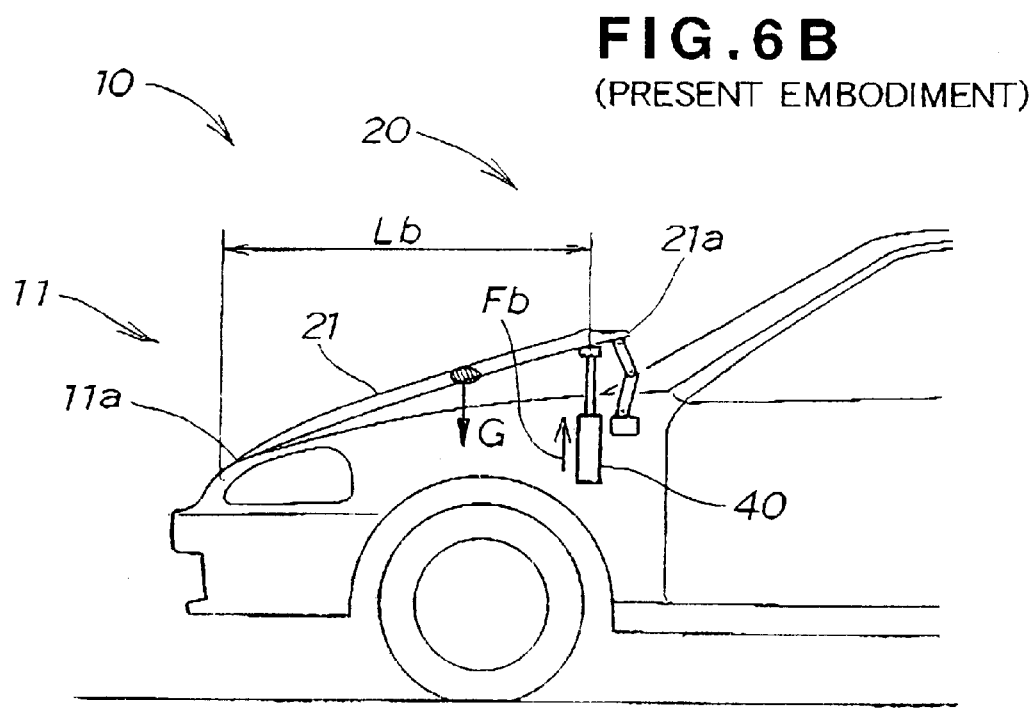

Referring now to FIGS. 6A and 6B, discussion will be made as to a comparative example wherein the actuator is located forward of the center of gravity of the hood, and the preferred embodiment of the present invention wherein the actuator is located rearward of the center of gravity of the hood.

The comparative example of FIG. 6A represents a hood assembly 110 wherein an actuator 140 is located forward of the center of gravity G1 of a hood 121 in a lengthwise direction of a vehicle 100 and functions to lift up a rear end 121a of the hood 121 about the center of a front end 101a of a vehicle body 101 when the vehicle encounters a collision with a protective object (not shown). Assume that the distance between the front end 110a of the vehicle body 101 and the actuator 140 is represented by La, and the lifting force of the actuator 140 for the vehicular hood 121 is represented by Fa.

In contrast, the hood assembly 20 according to the preferred embodiment of the present invention, shown in FIG. 6B, represents a case wherein the actuator 40 is located at the position rearward of the center of gravity G of the vehicular hood 21 in the lengthwise direction of the vehicle 10. Assume that the distance between the front end 11a of the vehicle body 11 and the actuator 40 is represented by Lb, and the lifting force of the actuator for the vehicular hood 21 is represented by Fb.

In FIGS. 6A and 6B, assuming that the hood 121 of the comparison example is identical to the hood 21 of the present invention, comparison is made between the lifting force Fa of the actuator 140 of the comparison example and the lifting force Fb of the actuator 40 of the present invention. Then, a relationship is established as expressed by the following equation (1):

$$La \cdot Fa = Lb \cdot Fb \tag{1}$$

The relationship between the distance La and the distance Lb is expressed by a formula La<Lb, and the lifting force Fb of the preferred embodiment of the present invention is smaller than the lifting force Fa of the comparison example as expressed by the following formula:

$$Fb < Fa \tag{2}$$

That is, the actuator 40, located at the position rearward of the center of gravity G of the hood 21, may be of the type which produces a lower lifting force than that of the actuator 140 of the comparison example, located at the position forward of the center of gravity G1 of the vehicular hood 121, thereby enabling the actuator 40 to be manufactured in a minimized structure.

Now, an operation of the actuator of the preferred embodiment is described with reference to FIGS. 7A to 7C.

Figure 7A:
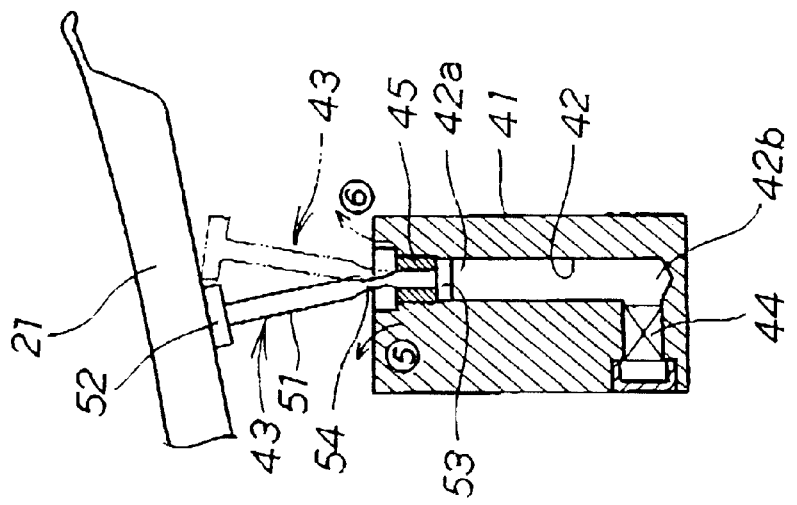
FIGS. 7A to 7C are schematic views illustrating the sequence of operation of the actuator of the vehicular hood assembly according to the present invention.

In FIG. 7A, the actuator 40 remains in a condition, prior to its operation, wherein the rod 43 is received in the cylinder section 42 of the actuator block 41.

Figure 7B:
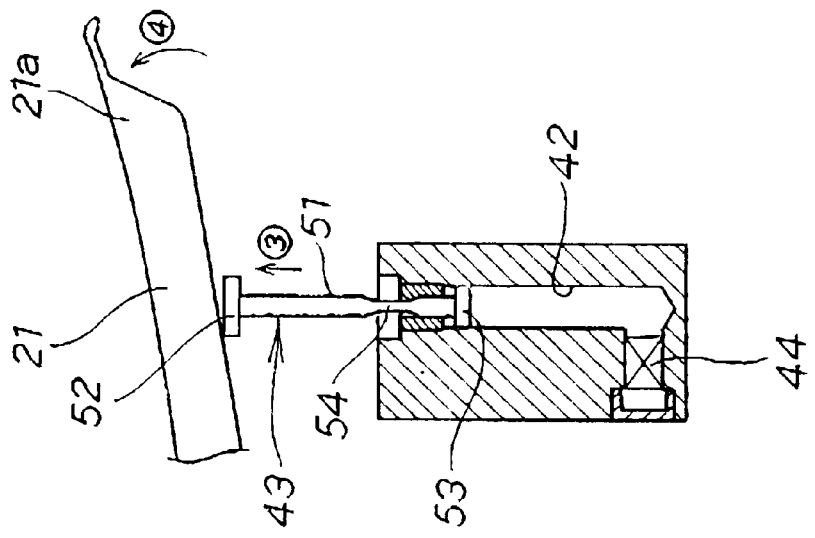

In FIG. 7B, when the vehicle 10 collides with the protective object M as shown in FIG. 2, the gas generator 44 is actuated in response to an output signal fed from the control unit 24. In this instance, the rod body 51 of the rod 43 is raised in a direction as shown by arrow $\hat{3}$ to allow the pad 52, located at the end of the rod body 51, to be brought into abutting engagement with the lower wall of the hood 21 for thereby lifting up the rear end 21a of the hood 21 in a direction as shown by arrow $\hat{4}$.

Figure 7C:
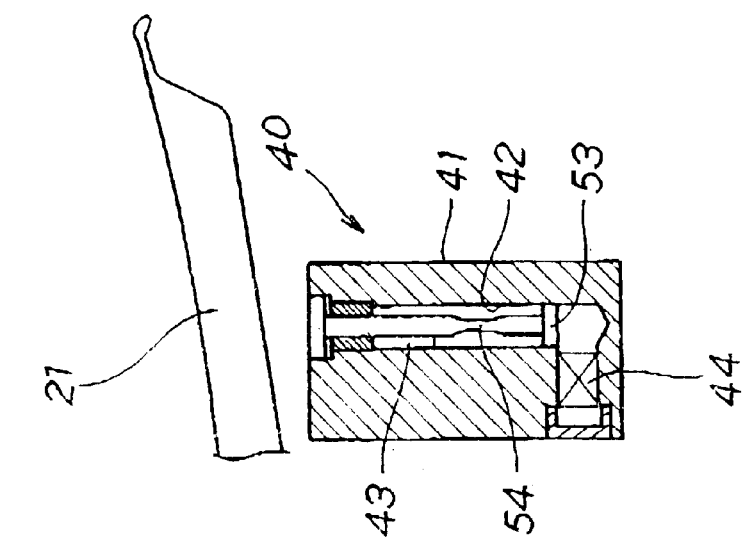

In FIG. 7C, in a condition in which the piston 53 of the rod 43 is brought into abutting engagement with the piston-removal stopper member 45 and the rod body 51 remains at its maximum protruding position, the constricted portion 54 formed in the rod body 51 is stopped at a position where the constricted portion 54 protrudes out from the piston-removal stopper member 45. The constricted portion 54 has intentionally reduced rigidity and hence serves as a weakened portion. When the protective object M shown in FIG. 2 encounters the secondary collision with the hood 21, the load, exerted to the hood 21 and the protective object M, is concentrated on the rod body 51. In this instance, the constricted portion 54 of the rod body 51 is inevitably bent in a direction shown by arrow $\hat{5}$ or arrow $\hat{6}$ to retain the hood 21 at its lifted position without causing the rod 43 to return to its original position.

As will be understood from FIGS. 7A to 7C, the constricted portion 54 is bent after the constricted portion 54 has passed through the piston-removal stopper member 54 Thus, the term "when the rod is raised" represents a situation in which the constricted portion 54 has passed through the piston-removal stopper member 45.

In the preferred embodiment, as seen in FIGS. 1 and 3, although the vehicular hood assembly 20 has been shown and described as including two actuators 40, 40, the present invention is not limited thereto and the hood assembly 20 may be provided with a single actuator or with more than three actuators.

While, in the illustrated embodiment, the constricted portion 54 of the rod body 51 has been shown and described as an example which has a lower diameter than the outer diameter of the rod body 51, the present invention is not limited thereto, and the rod body 51 may be formed of a laterally extending through-bore in place of the constricted portion, or may be formed of a notch formed at a side of the rod body 51 by which the rigidity is intentionally lowered than the other remaining part of the rod body 51.

Obviously various minor changes and modifications of the present invention are possible in the light of the above teaching. It is therefore to be understood that within the scope of the appended claims, the invention may be practiced otherwise than as specifically described.

What is claimed is:

1. A hood assembly for a vehicle, comprising:
   a vehicle body having a vehicular hood; and
   at least one actuator for lifting up a rear end portion of said vehicular hood to a given height to thereby place the hood in a raised position when the vehicle collides with an object to be protected, said actuator including an actuator block mounted to the vehicle body, and a rod vertically disposed in the actuator block and movable in the axial direction thereof to protrude from the actuator block, the rod having a weakened portion having a lower rigidity than the remaining portion of the rod wherein when the actuator is operated in response to collision of the vehicle with the object the rod moves upward to lift up the hood to the raised position, and when the object further encounters a secondary collision with the hood which has been placed to the raised position by the rod, an impact load exerted on the hood causes the weakened portion of the rod to bend and then engage a portion of the actuator block to thereby prevent the rod from moving downward so that the hood is kept in the raised position.

2. A hood assembly according to claim 1, wherein said weakened portion of said rod comprises a constricted portion having a smaller diameter than an outer diameter of said remaining portion of said rod.

3. A hood assembly according to claim 1, wherein said actuator is located rearward of a center of gravity of said hood.

4. A hood assembly according to claim 1, wherein said actuator block has a stopper that prevents the removing rout from the actuator block when the rod is moved upward, the weakened portion of the rod is arranged such that when the rod is disposed in a fully raised position, the weakened portion projects from the stopper member, and when the rod is caused to bend at the weakened portion, the weakened portion engages the stopper member of the actuator block.

5. A hood assembly for a vehicle, comprising:

a vehicle body having a vehicular hood; and at least one actuator for lifting up a rear end portion of the hood to a given height when the vehicle collides with an object so as to place the hood in a raised position;

said actuator including an actuator block mounted to the vehicle body, said actuator block having a cylinder and a piston-removal stopper member in said cylinder, said actuator further having a piston with a rod which passes through said stopper member to protrude from the actuator block, said rod having a weakened portion and a remaining portion such that the weakened portion has a lower rigidity than the remaining portion, wherein when file actuator is operated in response to collision of the vehicle with the object, the rod moves upward to lift up the hood to the raised position; and when the object further encounters a secondary collision with the hood which has been placed in the raised position by the rod, an impact load exerted on the hood causes the weakened portion of the rod to bend and engage the stopper member to thereby prevent the rod from moving downward so that the hood is kept in the raised position.

6. A hood assembly according to claim 5, wherein said weakened portion of said rod a constricted portion having a smaller diameter than an outer diameter of said remaining portion of said rod.

7. A hood assembly according to claim 5, wherein said actuator is located rearward of a center of gravity of said hood.

8. A hood assembly for a vehicle, comprising:

a vehicle body having a vehicular hood; and at least one actuator for lifting up a rear end portion of the hood to a given height when the vehicle collides with an object so as to place the hood in a raised position, said actuator mounted to the vehicle body, said actuator including means for keeping the hood in the raised position after said actuator has lifted the hood to the raised position, said keeping means including a rod, wherein when the actuator is operated in response to collision of the vehicle with the object, the rod moves upward to lift up the hood to the raised position, and when the object further encounters a secondary collision with the hood which has been placed in the raised position by the rod, an impact load exerted on the hood causes the rod to bend and the keeping means to keep the hood in the raised portion.

* * * * *